United States Patent [19]

Suzuki et al.

[11] Patent Number: 5,316,856
[45] Date of Patent: May 31, 1994

[54] SILICON NITRIDE BASE SINTERED BODY

[75] Inventors: Junichiro Suzuki; Masahide Kayukawa, both of Gifu, Japan

[73] Assignee: NGK Spark Plug Co., Ltd., Nagoya, Japan

[21] Appl. No.: 75,917

[22] Filed: Jun. 14, 1993

Related U.S. Application Data

[63] Continuation of Ser. No. 464,122, Jan. 12, 1990, abandoned, which is a continuation-in-part of Ser. No. 443,958, Dec. 1, 1989, abandoned.

[30] Foreign Application Priority Data

Dec. 3, 1988 [JP] Japan .............................. 63-306320
Jan. 12, 1989 [JP] Japan ...................................... 1-5791

[51] Int. Cl.$^5$ ........................................... C04B 35/58
[52] U.S. Cl. ................................. 428/446; 428/698; 428/697; 428/699; 428/701; 428/704; 501/96; 501/97; 501/98; 501/126; 501/154
[58] Field of Search ............ 501/96, 97, 98, 126, 501/154; 428/446, 698, 701, 697, 704, 699

[56] References Cited

U.S. PATENT DOCUMENTS

| | | | |
|---|---|---|---|
| 4,038,042 | 7/1977 | Baumgartner et al. | 501/98 |
| 4,146,107 | 3/1979 | Ishii et al. | 501/126 |
| 4,310,499 | 1/1982 | Mitomo et al. | 501/154 |
| 4,312,899 | 1/1982 | Lahmann | 427/180 |
| 4,327,187 | 4/1982 | Komatsu et al. | 501/97 |
| 4,354,990 | 10/1982 | Martinenyo et al. | 501/154 |
| 4,383,958 | 5/1983 | Moschetti et al. | 501/98 |
| 4,388,414 | 6/1983 | Mangels et al. | 501/98 |
| 4,506,020 | 3/1985 | Butler et al. | 501/97 |
| 4,539,251 | 9/1985 | Sugisawa et al. | 428/698 |
| 4,563,433 | 1/1986 | Yeckley et al. | 501/97 |
| 4,640,703 | 2/1987 | Matsuhiro et al. | 501/97 |
| 4,640,903 | 2/1987 | Matsuhiro et al. | 501/97 |
| 4,699,890 | 10/1987 | Matsui | 501/97 |
| 4,702,869 | 10/1987 | Higuchi et al. | 264/65 |
| 4,711,644 | 12/1987 | Yeckley et al. | 501/97 |
| 4,795,724 | 1/1989 | Soma et al. | 501/98 |
| 4,801,414 | 1/1989 | Sima et al. | 264/65 |
| 4,801,565 | 1/1989 | Matsui | 501/98 |
| 4,818,635 | 4/1989 | Ekström et al. | 428/678 |
| 4,826,791 | 5/1989 | Mehrotra et al. | 501/98 |
| 4,830,991 | 5/1989 | Matsui | 501/97 |
| 4,880,755 | 11/1989 | Mehrotra et al. | 501/96 |
| 4,908,171 | 3/1990 | Clausses et al. | 264/56 |
| 4,935,389 | 6/1990 | Umebayashi et al. | 501/97 |
| 4,940,680 | 7/1990 | Takahashi | 501/97 |

FOREIGN PATENT DOCUMENTS

| | | |
|---|---|---|
| 0082317A2 | 6/1983 | European Pat. Off. . |
| 3216308A1 | 4/1982 | Fed. Rep. of Germany . |
| 63-1278 | 1/1988 | Japan . |
| 63-35594 | 7/1988 | Japan . |
| 1153575 | 6/1989 | Japan . |

OTHER PUBLICATIONS

Journal of the American Ceramic Society, "Phase Relations and Stability Studies in the Si3N–SiO2–Y2O3 Psuedoternary System", F. F. Lange, S. C. Singhal and R. C. Kuznicki, May–Jun. 1977, pp. 249–252, vol. 60, No. 5–6.

PCT International Patent Appln. No. PCT/US88/00994, filed Mar. 25, 1988, Pankaj, Kumar Mehrotra et al.

Matsuo et al., "Recent Advance in the Sintering Method of Si3N4, " Ceramics Japan, vol. 18 (1983), No. 1, pp. 10–16.

Primary Examiner—A. A. Turner
Attorney, Agent, or Firm—Fish & Richardson

[57] ABSTRACT

A sintered body of silicon nitride base solidly formed of interior and surface portions wherein the rate of decrease of the content Si or $Si_3N_4$ and Sialon grains in the surface portion, with respect to that in the interior portion, is not less than 20% by weight or 30–100 vol %, respectively. The grain boundary phase of the surface portion is glassy, or crystallized partly or entirely. Crystallized boundary phase comprises $Si_3N_4$-$Y_2O_3$ base compounds $Si_3N_4$-$nY_2O_3$-$mX$ (n=1–5, X=$SiO_2$, $Al_2O_3$, m=0–4) such as mellilite, J phase (mohlerite), K phase (wollastonite), H phase (apatite), or A phase ($Si_3N_4.5Y_2O_3.Al_2O_3$). Sintering aids of $Al_2O_3$, $Y_2O_3$, AlN, MgO, CaO, $Y_2O_3$ and/or rare earth oxides form boundary phases. The sintered body may comprise 30% by weight or less of compounds (oxide, carbide or nitride) of subgroups IVa, Va and VIa of the International Periodic Table as third dispersed component.

This sintered body with the modified surface portion exhibits the intrinsic property of the interior portion and the property of the surface portion resulting in high wear resistance and toughness useful as cutting tools.

42 Claims, 6 Drawing Sheets

⊖ Si₃N₄ - SIALON GRAINS
○ BOUNDARY PHASE
  (CRYSTALLINE OR GLASSY)
△ THIRD PHASE (e.g., TiN ETC.)

FIG. 11

SILICON NITRIDE BASE SINTERED BODY

This application is a continuation of U.S. application Ser. No. 97/464,122, filed Jan. 12, 1990, now abandoned which is a CIP of 07/443,958 filed Dec. 1, 1989 now abandoned.

This invention relates to a silicon nitride base sintered body and, more particularly, to a silicon nitride base sintered body which has an improved abrasion resistance without being lowered in essential properties, such as toughness. The present invention may be applied to machining tools, abrasion (wear) resistant parts and sliding parts.

BACKGROUND OF THE INVENTION

There is shown in JP Patent Kokoku Publication No. 63-1278 a conventional silicon nitride sintered body having a surface coating of a ceramic material having high hardness or superior wear resistance.

A further silicon nitride sintered body has been known in which crystal phases of both $\alpha$- and $\beta$-Sialons are homogeneously distributed over the entire sintered body (JP Patent Kokoku Publication No. 63-35594 (1988) etc.). Problems to be solved by the present invention:

As for the former sintered body, it is difficult to obtain a sufficient bonding force to the substrate through the difference in thermal expansion and/or chemical affinity between the coating ceramic material and the silicon nitride substrate, entailing a high cost counted as a problem in economy. Thus the former sintered body has found almost no practical application.

The latter sintered body which includes both the crystal phases of $\alpha$- and $\beta$-Sialons evenly distributed over the entire sintered body suffers variation in its properties as their proportion changes and cannot develop every property. Namely, if one attempts to enhance one property any of other properties is forced to be deteriorated, resulting in at most an intermediate performance on balance of the both.

SUMMARY OF THE DISCLOSURE it is therefore an object of the present invention to provide a silicon nitride base sintered body in which the surface is improved to form a surface portion having superior abrasion resistance to exhibit the properties of the material in the surface and interior portions satisfactorily.

As a result of out eager investigations into the reason of the poor abrasion resistance of the silicon nitride, the following recognition has been reached, based on which the present invention has been accomplished.

In a first aspect of the present invention, the above object may be accomplished by a silicon nitride base sintered alloy formed of an interior portion and a surface portion formed solid with the interior portion, wherein (a) the rate of decrease of the silicon content at the surface portion amounts to 20 wt % or more of the silicon content in the interior portion, or alternatively (b) the amount of crystal grains of silicon nitride and Sialon in the surface portion is less by 30 vol % or more than that in the interior portion. above object may be accomplished by a silicon nitride base sintered body formed of an interior portion and a surface portion formed solid with the interior portion wherein the ratio of the content of crystalline compound constituting part or entire of the grain boundary phase in the interior portion to that in the surface portion, as measured by the X-ray peak intensity ratio method, is less than 0.5.

In a third aspect of the present invention, which means a further improvement over the first and the second aspects, the ratio of the content of the crystalline compounds constituting part or entire of the grain boundary phase in the surface portion to the content of the of the silicon nitride and sialon in the same portion, as measured of the maximum X-ray intensity ratio method, is 0.3 or more.

In a fourth aspect of the present invention, mellilite is the "crystalline compound(s) constituting part or entire of the grain boundary phase" of the surface portion in the second aspect.

In a fifth aspect of the present invention, mellilite is the "crystalline compound(s) constituting part or entire of the grain boundary phase" of the surface portion in the third aspect.

The effect of the present invention may be exhibited in the following embodiments.

In the first aspect, the grain boundary phase may be a glass phase, or a crystallized phase in which part or entire of the grain boundary phase is crystallized. The grain boundary phase of the surface portion is mainly of glass phase in a case where $Y_2O_2$ is not (or little) present. In a case where the crystallization treatment is not applied, the glass phase will remain in the boundary phase of the surface portion. The crystalline phase contained in the grain boundary phase, the $Si_3N_4$-$Y_2O_3$ base compound ($Si_3N_4.nY_2O_3.mX$), is the mellilite phase, J-, K-, H- or A-phase, or a mixed phase thereof. These phases may be expressed by the following formulae:

M phase (mellilite) $Si_3Y_2O_3N_4$ ($Si_3N_4.Y_2O_3$)
J phase (mohlerite) $Si_2Y_4O_7N_2$ ($Si_2N_2O.2Y_2O_3$)
K phase (wollastonite) $SiYO_2N$ ($Si_3N_4.2Y_2O_3.SiO_2$)
H phase (apatite) $Si_7Y_{10}O_{23}N_4$ ($Si_3N_4.5Y_2O_3.4SiO_2$)
A phase $Si_3Y_{10}Al_2O_{18}N_4$ ($Si_3N_4.5Y_2O_3.Al_2O_3$)

These phases may be summarized by the following formula:

$Si_3N_4$-$nY_2O_3$-$mX$ (n=1-5, X=$SiO_2$, $Al_2O_3$, m=0-4)

Thus it has been found that the workpiece or material to be cut is mostly an iron base alloy, to which silicon Si, the main constituent element of the silicon nitride, shows high chemical affinity, which accounts for poor abrasion resistance of silicon nitride. In sintering silicon nitride, attempts have so far been made to prevent decomposition and vaporization of silicon nitride.

The present invention starts from the recognition that the sintered body of silicon nitride base, in which the decomposition and vaporization of the silicon nitride component is ingenously taken advantage of, and the rate of decrease of the silicon content at the surface portions amounts to a defined value or more relative to the silicon content in the silicon nitride in the interior portion, may be improved in the abrasion resistance without being lowered in the toughness.

Thus it is a feature of the first aspect that the silicon content in the surface portion of the sintered body of silicon nitride differs from that in its interior portion and that the proportion of the boundary phases in the surface portion is increased correspondingly. The rate of decrease of the silicon content is calculated from the formula shown as follows:

Rate of decrease of Si =

-continued $$\frac{\text{Si content in the interior portion} - \text{Si content in the surface portion}}{\text{Si content in the interior portion}} \times 100 \text{ (by weight)}$$

With the sintered body of silicon nitride of the present aspect, (a) and Si content in its surface portion is decreased by 20 wt % or more as compared with that in its interior portion, or (b) the rate of decrease of $Si_3N_4$ and/or Sialon grains in the surface portion is 30 vol % or more relative to the interior portion in which $Si_3N_4$ remains unvaporized. Therefore the essential properties, one of them being the superior abrasive resistance in the surface portion and the other being high toughness in the interior portion, may be exhibited satisfactorily. In other words, the sintered body of the present invention does not exhibit properties that are the intermediate between these two properties. Accordingly it has become possible with the present sintered body to improve abrasion resistance by surface modification without lowering the essential properties in the interior portion.

The surface portion and the interior portion are not peeled off one from the other since there portions form solid body being bonded and unified to each other with a strong bonding force.

The present invention also provides a process for producing the improved silicon nitride base sintered body, which will be elucidated later.

DESCRIPTION OF THE PREFERRED EMBODIMENTS

According to the first aspect (a), the rate of Si decrease is selected to be not less than 20 wt %, because, if the above mentioned rate of decrease is insufficient, the effect of decrease is unsatisfactory, whereas, if the rate of decrease is equal to or exceeds 20 wt %, the abrasion resistance may be improved without lowering the toughness which is the property of the interior portion. The rate of decrease is preferably not less than 50 wt % since then the abrasion resistance may be improved more conspicuously. The rate of decrease may be 25–61 wt. %, or more preferably 50–60 wt. % The Si content in the surface portino may also be almost nil. However, in such case, although the abrasion resistance may be improved more conspicuously, surface roughness is lowered. Therefore, the Si content in the surface portion should be preferably decreased to such a degree that a brittle compound is not produced.

According to the first aspect (b), the rate of decrease of the silicon nitride and Sialon grains is selected to be not less than 30 volt %, because, if the above mentioned rate of decrease is insufficient, the effect of decrease is unsatisfactory, whereas, if the rate of decrease is equal to or exceeds 30 vol %, the abrasion resistance may be improved without lowering the toughness which is the property of the interior portion. The rate of decrease is preferably not less than 50 vol % since then the abrasion resistance may be improved more conspicuously. The content of silicon nitride and Sialon grains in the surface portion may also be almost nil. However, in such case, although the abrasion resistance may be improved more conspicuously, surface roughness might be lowered occasionally. Therefore, this rate of decrease in the surface portion should be preferably kept to such a degree that a brittle compound is not produced.

The silicon nitride base sintered body of the present invention, which is usually mainly comprised of silicon nitride, may also be formed of Si-Al-O-N (referred to as "Sialon"). The silicon nitride and/or Sialon may be selected according to the intended use and applications and may be of the $\alpha$ or $\beta$ type, or mixtures thereof.

The components other than silicon nitride and Sialon may be the grain boundary phase forming components or third components other than the grain boundary phase. The grain boundary phase forming components may be generally grouped as sintering aids and may consist only of vitreous (glassy) phases or may contain various crystal phases other than vitreous phases. The third components may be those components which are effective to improve abrasion resistance of toughness. Thus the third components may include compounds, for example, carbides, nitrides or oxides, of the transition metals of the groups IVa, Va and VIa of the International Periodic Table and one or more of solid solutions of two or more of these compounds. These compounds are preferably contained in an amount of not more than 30 wt % so as not to lower the toughness of the sintered body. Preferred third components are TiN, $ZrO_2$, TiC, WC, $TiB_2$, $HfO_2$, ZrC and/or whiskers such as SiC and/or $Si_3N_4$, preferably of a diameter of 0.3-2.0 $\mu$m with a length of 10-100 $\mu$m. In general, dispersed grains of particle shape serves to improve hardness, or to improve toughness due to the grain growth-inhibiting effect.

The interior portion is the portion of the sintered body exclusive of the surface portion, that is, the portion of the sintered body exhibiting the inherent properties of the sintered body. Since the $Si_3N_4$ is not removed by decomposition and vaporization in the interior portion, the above mentioned silicon nitride, grain boundary phase forming components and the third components remain as they be.

The surface portion is a portion of the sintered body in which components other than $Si_3N_4$ and/or Sialon are left corresponding to an amount by which the silicon content is decreased with vaporization of $Si_3N_4$. Thus the relative amount of the components other than $Si_3N_4$ and/or Sialon is increased correspondingly in the surface portion. The thickness of the surface portion depends on the purpose, use and the method of preparation and is usually in the range of from several $\mu m$ to 0.1 mm, occasionally up to 1 mm. It is noted that the sintered body in which the above compositional ratios are not changed abruptly but are changed only continuously at the boundary between the surface portion and the interior portion, may also be included within the scope of the present invention. Thus it is only sufficient if the sintered body is formed by a surface portion having a specified relative composition and an interior portion also having a specified relative composition.

Inasmuch as the present sintered body is usually employed with its as-sintered surface, with the $Si_3N_4$ surface component being vaporized off, a special attention need be exercised against worsening of surface roughness through such vaporization. Thus the surface vaporization should be controlled so that the surface roughness is preferably not more than 12.5S pursuant to JIS B 0601. For use in which special importance is attached to surface roughness, it is preferred for the grain boundary phase forming components to be left so as to cover the surface of the sintered body.

The following features are in common to the various aspects of the present invention. That is, (i) the amount of the grain boundary phase in the surface portion is substantially more than that in the interior position; and (ii) the degree of crystallization in the surface portion is higher than that in the interior portion. By the synergistic effect of these two features, the wear resistance is improved significantly. The features defined by the first to third aspects determine the range which is effective in improving the wear resistance.

Of the crystalline compounds constituting the grain boundary phase on the surface, mellilite is most preferred in a case where the boundary phase contains the crystalline phase. It has thus been found that, when the $Si_3N_4 \cdot Y_2O_2$ tetragonal compound, referred to as mellilite, is mainly crystallized as the surface portion, and contained therein in a higher proportion than in the interior portion; the resistance to wear may be improved significantly.

It has been found that most of the workpieces are iron base alloys, whereas silicon Si as the main constitutional element of silicon nitride has high chemical affinity, so that it is inferior in wear resistance and the degree of the reaction is lowered by such an extent that the content of Si reduced as compared with $Si_3N_4$ to improve stability against chemicals and wear resistance. It is critical for the crystalline grain boundary phase compounds to exist in a larger amount in the surface portion and in a lesser amount n the interior portion, since crystallization of a higher content of the crystalline grain boundary phase $Si_3N_4 \cdot Y_2O_2$ base compound in the interior portion leads to a lowered toughness at room temperature.

The present invention has been accomplished on the basis of the foregoing. In the first aspect, (a) the Si content, or (b) the content of crystal grains of $Si_3N_4$ and/or Sialon, is less in the surface portion by the defined values, respectively, than in the interior portion. Below the defined values for (a) or (b), respectively, a sufficient effect of surface modification, that is the increase in wear resistance, cannot be displayed.

In the second aspect, with the ratio of the content of the grain boundary phase crystalline compound in the surface portion to that in the interior portion of 0.5 or more as measured by the X-ray peak intensity ratio method, a sufficient effect of surface modification cannot be displayed.

In the third aspect, with the ratio of the content in the grain boundary phase crystalline compound in the surface portion to that in the crystal grains of $Si_3N_4$ and/or Sialon in the same portion of 0.3 or more, as measured by the maximum X-ray intensity ratio method, the resistance to wear may be improved more significantly.

The base sintered body is usually prepared by ordinary sintering under the atmospheric pressure. However, it may also be prepared by sintering under a pressurized gas atmosphere or hot isostatic sintering (HIP method). It is basically necessary for the sintering atmosphere to contain nitrogen, however, under the condition, for instance as a manner of decreasing the amount of silicon, or silicon nitride and/or Sialon grains in the surface portion. The sintering pressure may vary from vacuum (or reduced pressure) to several thousands of atmospheres. The sintering temperature is preferably in the range of from 1500° to 1800° C. and more preferably 1550° to 1800° C., and most preferably in the range of from 1600° to 1700° C.

The inventive sintered body may be produced substantially in the following manner. Powders of silicon nitride and sintering aids are weighed at a desired compositional ratio, mixed together and pulverized. The sintering aids may be those employed for sintering under atmospheric pressure or pressurized gas or sintering by HIP, and are preferably free of the element Si. Thus the sintering aids may be enumerated for example by $Al_2O_3$, AlN, MgO, CaO, $Y_2O_3$ or oxides of rare earth elements. The starting powdery mass is formed molded or compacted under pressure to a desired shape and sintered. For vaporizing (or volatilizing) $Si_3N_4$ on the surface during sintering, the partial pressures of nitrogen and/or silicon may be lowered, or a reducing atmosphere may be employed.

Typically, the starting powdery mass may be formulated as follows:

| | |
|---|---|
| $Si_3N_4$ | 50-95 wt %, preferably 60-90 wt % most preferably 64-86 wt % |
| sintering aid* | 5-30 wt %, preferably 7-20 wt % most preferably 10-20 wt % |
| third component** | 30 wt % or less, preferably 25 wt % or less |

*sintering aid: $Al_2O_3$, AlN, $Y_2O_3$, MgO, CaO, AlON, YN, rare earth oxide
**compounds (oxide, carbide, nitride etc.) of Subgroups IVa (Ti, Zr, Hf), Va (V, Nb, Ta) and VIa (Cr, Mo, W)

The starting powdery mass (mixture) has an average particle size preferably of 5 $\mu m$ or less, more preferably 2 $\mu m$ or less.

Thus the producing process is summarized as follows:
(a) preparing a starting powdery mass of the defined composition, including mixing (usually with simultaneous pulverization),
(b) forming into a desired shaped compact
(c) sintering the compact under the condition such that silicon nitride disposed on the surface of the sintered body can be vaporized to from a Si-decreased surface portion at a specific temperature.

Figure 5:
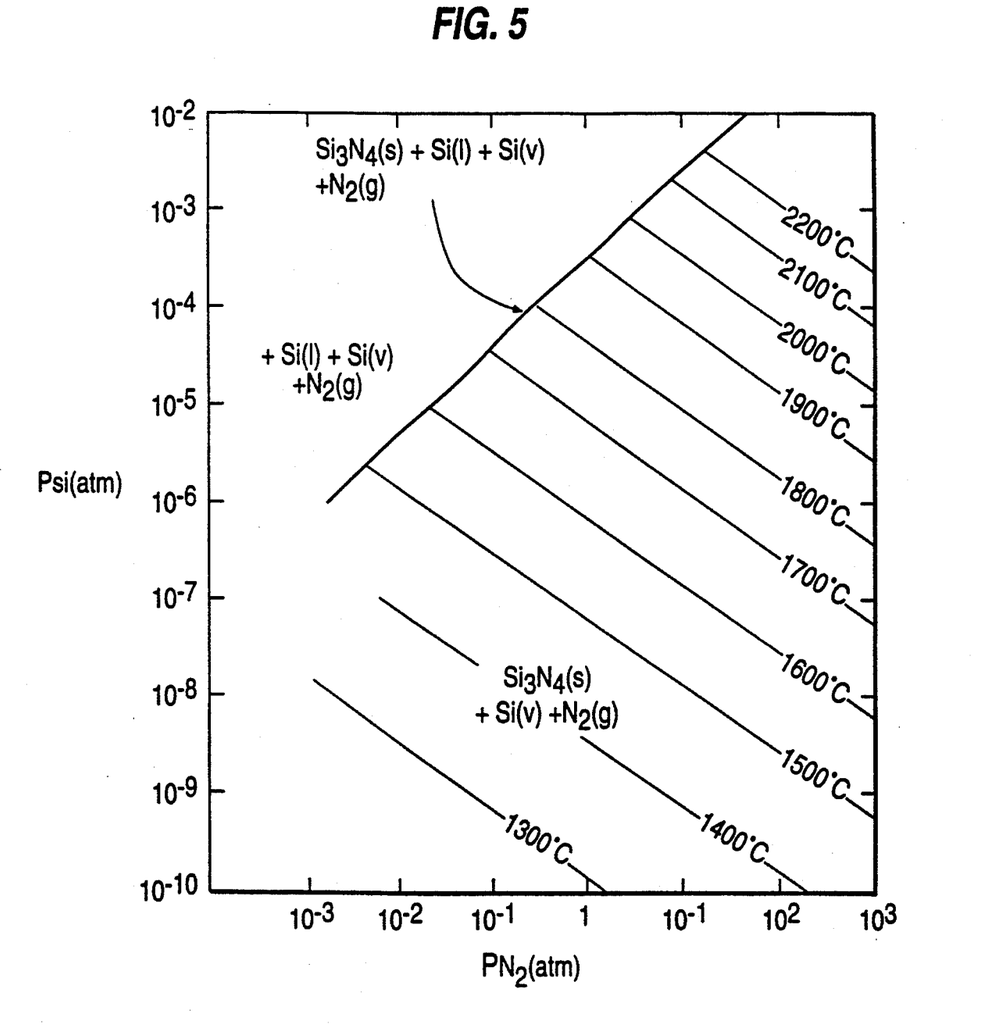
FIG. 5 is a known diagram showing the relation between the $Si_3N_4$ phase and partial pressures of sintering atmosphere.

The sintering is performed for certain period of time sufficient to sinter the compact preferably 0.5–5 hours, more preferably for 1–3 hours. The sintering condition is established by a specific atmosphere for the sintering, with reduced partial pressures of nitrogen and/or silicon, or a reducing atmosphere such as those (particularly, additional to reduced partial pressures) containing $CO_2$ and/or CO. Generally the sintering condition varies depending on the composition and sintering temperature. That is, the atmosphere is set at a slightly lower partial pressure of $N_2$ and/or Si than those recognized to be proper for certain composition relative to the temperature, e.g., preferring to FIG. 5. In this manner appropriate amount of Si and N can be decomposed and volatilized from the surface portion to such an extent that would not bring about a rough surface.

The resultant surface portion of the sintered body is formed mainly of the sintering aids and/or resultant compounds thereof (or further third components) in which Si and/or N may be contained as solid solution. Through vaporization of Si and N, the remaining boundary phases and third components in the surface portion are increased relative to the interior portion, entailing change in the density and hardness (hardness being enhanced). The amount of silicon nitride and/or Sialon in the surface portion is less than the interior portion by at least 30% by volume, up to 100% by volume.

In the fourth aspect, the content of the mellilite in the surface portion differs from that in the interior portion when measurement is made is made as the X-ray peak intensity ratio. This ratio of the mellilite contents in the interior portion to that in the surface portion is selected to be less than 0.5 because a sufficient effect cannot be demonstrated at 0.5 or more, and the wear resistance can be increased without lowering the desirable properties of higher toughness in the interior portion.

In the fifth aspect, the maximum X-ray intensity ratio of the mellilite content to the silicon nitride content in the surface portion is not less than 0.3. In this case, the mellilite content can be positively increased while the Si content can be decreased to improve wear resistance significantly.

Although the sintered body of silicon nitride base may be formed mainly of silicon nitride in many cases, it may be also formed of Sialon, as discussed hereinabove, since the purport of the present invention resides in surface modification which is achieved by increasing the content of grain boundary phase crystalline compound, such as mellilite, in the surface portion as compared with that in the interior portion. Silicon nitride or Sialon of $\alpha$- or $\beta$-type or a mixture thereof may be selectively employed according to use and applications.

According to the present invention, the compositional ratio of $Y_2O_3$ is usually 1 to 20 wt % and preferably 1 to 10 wt % in the case where the grain boundary phase contains the crystalline compounds. It is because $Y_2O_3$ is most preferred as the donor for yttrium Y, a constituent element for the grain boundary phase crystalline compound, such as mellilite and not less than 1 wt % of $Y_2O_3$ is necessary to this end, however, an amount in excess of $Y_2O_3$ causes the high temperature characteristics to be lowered as a result of the increase in the grain boundary phase. The element Y may also be introduced as the compounds other than oxides, such as nitrides or silicides. These compounds are introduced in an amount computed as $Y_2O_3$. $Al_2O_3$ and/or AlN playing an important role in mellilite crystallization may also be introduced simultaneously with $Y_2O_3$. The preferred amounts of $Al_2O_3$ and AlN are 1 to 10 wt % and 1 to 10 wt %, respectively. AlN may be added in a slightly more amount than $Al_2O_3$ to produce a more favorable result. In addition, any customary sintering aids for normal pressure sintering of $Si_3N_4$, such as at least one of MgO, $SiO_2$, $ZrO_2$ or oxides of rare earth elements may be employed.

Silicon nitride may be also replaced by third components effective in improving wear resistance and resistance to fracture. These ingredients may be enumerated by, for example, one or two or more of carbides, nitrides or oxides of the transition metals of the groups IVa, Va and VIa of the periodic table, or a solid solution of two or more of these compounds. These substitution compounds are preferably employed in an amount of not more than 30 wt % so as not to lower the toughness of the sintered body.

The interior portion means the portion of the silicon nitride base sintered body exclusive of the surface portion and represents the major portion, that is the portion displaying the intrinsic properties, of the present silicon nitride base sintered body.

The surface portion, according to the second aspect, represents the portion of the sintered body in which the relative content of the $Si_3N_4$-$Y_2O_3$ base compound, such as mellilite, is increased. The thickness of the surface portion is usually in the range of from several $\mu$m to 0.1 mm, ranging up to 1 mm occasionally, depending on the usages, applications or the production methods. When a large amount of the crystals of the $Si_3N_4$-$Y_2O_3$ base compound is exposed on and covers the entire surface of the sintered body, this layer is in a state where almost no $Si_3N_4$ and/or Sialon grains are contained (however, the third component=dispersed phase is contained) resulting in a state of 100% decrease of $Si_3N_4$ and Sialon. The thickness of such crystalline layer (100% decreased state) is preferably not more than 5 $\mu$m to prevent the strength of the sintered body in its entirety from being lowered. The present invention also encompasses the case in which the above compositional ratio is not changed abruptly, that is, changed continuously, it being sufficient if the sintered body has the surface portion having a predetermined compositional ratio and the interior portion having a predetermined compositional ratio.

The method for producing the sintered body in the fourth aspect of the present invention is as explained above. Although sintering is preferably effected under the vaporization conditions in the surface portion with a suitable amount of silicon nitride, the present invention is not limited to such method. The sintering is carried out in a nitrogen-containing atmosphere and the nitrogen partial pressure of from vacuum to several thousands of atmospheres, those which are employed conventionally in sintering silicon nitride or Sialon may be employed for sintering according to the present invention.

For forming the surface of the sintered body of the present invention upon (or after or subsequent to) sintering, it is preferred for the grain boundary phase to be crystallized as the $Si_3N_4$-$Y_2O_3$ base compound, such as mellilite. To this end, a temperature range of 1400° to 1700° C. and preferably 1500° to 1650° C. is maintained for a predetermined time, or the cooling rate is retarded. Maintaining that temperature may be performed consecutively of sintering or by usual sintering followed by reheating to the above mentioned temperature. During crystallization, special attention should be exercised so as not to perform excess heat treatment since otherwise the $Si_3N_4$-$Y_2O_3$ base compound, such as mellilite, is crystallized not only on the surface but in the interior grain boundary phase of the sintered body. For increasing the amount of mellilite crystallization in the surface portion as compared to that in the interior portion, the sintering atmosphere, such as nitrogen and/or oxygen partial pressures, may be controlled appropriately, or the surface may be covered by a composition capable of promoting mellilite crystallization.

Figure 11:
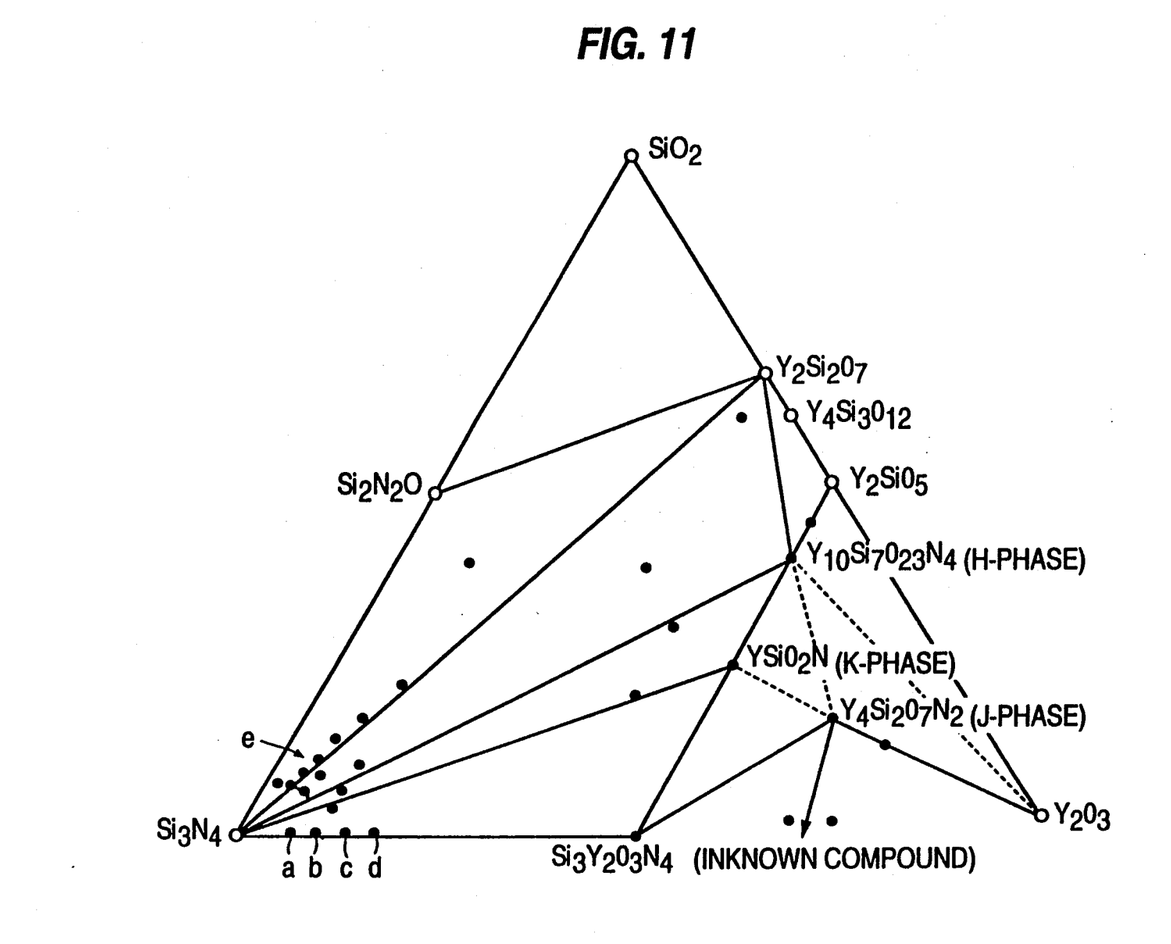
FIG. 11 is a known $SiO_2$-$Si_3N_4$-$Y_2O_3$ ternary phase diagram determined from specimens hot-pressed at 1600°–1750° C.

The progress of crystallization of the M-, J-, K-, H- and A-phases on the surface portion is basically influenced by adjustment of the sintering time and the amount of the $Y_2O_3$ component. In the present invention, the composition of the surface portion is subjected to complex variation due to the vaporization of components. Therefore, the resulting crystal phases are affected by variation of the atmosphere and also by compositional segregation during cooling. However, reference may be made, as far as local occurrence is concerned, to $SiO_2$-$Si_3N_4$-$Y_2O_3$ ternary phase diagram FIG. 11 (by F. F. Lange et al., J. Am. Ceram. Soc. 60 (5-6), p 249-252 (1977)) or an article by Hayasi, Yoh et al. (FIG. 3 or Powder and Powder Metallurgy 34 (1) p. 26-31).

EXAMPLES

The present invention will be explained with reference to numerous embodiments, which are given herein only for the sake of illustration.

EXAMPLE 1

First to Third Aspects

The Si content in the surface portion was decreased as compared with that in the interior portion, while the boundary phase crystalline compound, that is the $Si_3N_4$-$Y_2O_3$ base compounds, were crystallized on the surface portion, and investigation was made into the effect of these measures.

As powders of the starting material, powders of $Si_3N_4$ with a mean particle size of 0.6 μm (α $Si_3N_4$ rate of not less than 90 vol %), powders of $Al_2O_3$ or MgO with a mean particle size of 0.5 μm, powders of AlN with a mean particle size of 1.3 μm, powders of $Y_2O_3$ with a mean particle size of 1.2 μm, powders of $ZrO_2$ with a mean particle size of 0.4 μm, powders of TiN with a mean particle size of 1.2 μm, powders of HfN with a mean particle size of 1.7 μm and powders of WC with a mean particle size of 2.0 μm, were taken at the compositional ratios shown in the Table and mixed in a wet ball mill for 48 hours. The resulting mixtures were admixed with a forming agent and dried.

Any of the resulting powdered mixtures (starting powdery mass) was press formed in a metal mold and sintered in a atmosphere composed mainly of nitrogen under the nitrogen atmosphere of 0.7 to 10 atom (, and partially, also under the presence of a carbonic acid gas), and at a temperature of 1650° to 1750° C. to produce sintered products. The thickness of the surface portion of these sintered products, as measured by surface elimination by grinding and X-ray diffraction of a minute area (X-ray microanalyser), was about 0.01 to 0.1 mm for both cases.

The sintered products were finished to a size of SNMN 432 pursuant to JIS B 4103 to provide test pieces (or tips) 2. Finishing of the sintered products were performed by grinding for both the upper and the lower surfaces, with the lateral sides of the sintered product remaining in the state of the as-sintered surfaces. The size of the test pieces was adjusted at the time of press forming. Evaluation was made by the following three Tests 1 to 3, of which the Tests 1 and 2 are directed to the evaluation of abrasion resistance and the Test 3 is directed to the evaluation of strength. The results are shown in the Table and in FIG. 1.

All the samples exhibited densities of at least 99.5% relative to the theoretical density. The interior portion comprised of Sialon exhibited β-type in No. 3, No. C2 and No. 4, and (β-type+α-type) in Nos. 5-9 and No. C3 in which the α-ratio is 0.33, 0.28, 0.34, 0.42, 0.36 and 0.22, respectively in this order. The α-ratio is defined by $\alpha/(\alpha+\beta)$ as measured by the X-ray peak intensity ratio method.

α-Sialon is a solid solution of the substitution/interstitial type in which a part of Si elements in the α-$Si_3N_4$ structure is substituted with Al, and a part of N elements in the same structure is substituted with O, and further in which elements such as Li, Na, Mg, Ca, Y or rare earth elements form solid solution intruding into the interstitial lattice space between (Si, Al) and (O, N). Generally, such α-Sialon is expressed by a formula:

$$M_x(Si, Al)_{12}(O, N)_{16}$$

where M=Li, Na, Mg, Ca, Y or rare earth elements, and $0 < x X \leq 2$.

On the other hand, β-Sialon is a solid solution of the substitution type formed of a solid solution of $Al_2O_3$, AlN and $SiO_2$ in β-silicon nitride i.e., in which Al and O substitute for a part of Si elements and N elements, respectively, in the β-silicon nitride.

This β-Sialon is expressed by a formula:

$Si_{6-z}Al_zO_zN_{8-z}$ where $0 < z \leq 4$.

The conditions for the Tests 1, 2 and 3 are as shown below, with the conditions for the Test 2 being shown in brackets and with those for the Test 3 having shown in square brackets. The durability in the method 1 is given as the time which elapses until destruction or failure as will be subsequently described. The destruction or failure in this case is the consequence not only of the mechanical strength but of the increase in cutting or machining resistance caused by obrasion, and is used as the measure for obrasion resistance.

Figures 1, 2:
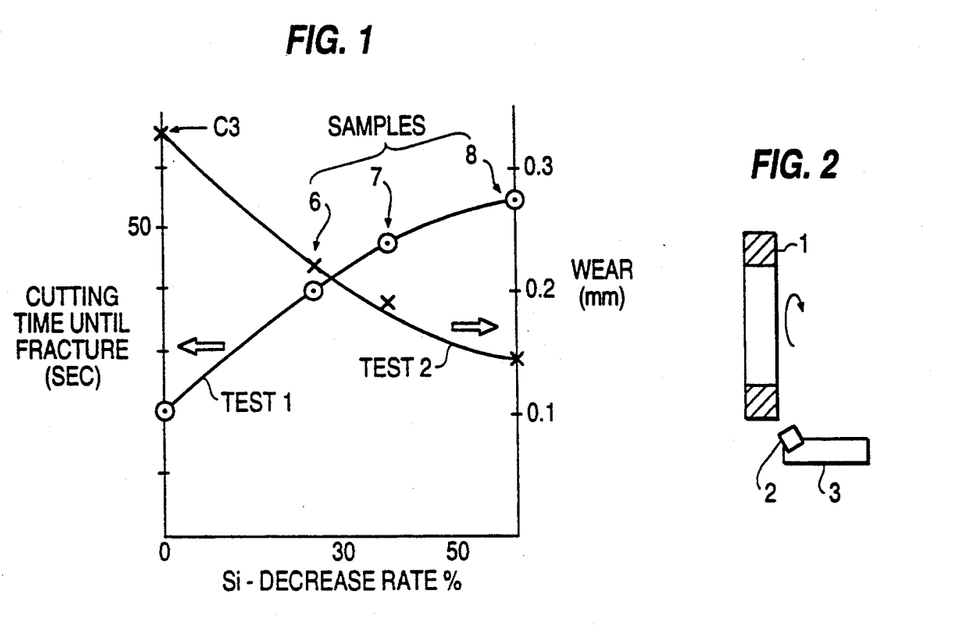
FIG. 1 is a chart showing the relation between the rate of Si decrease in the surface portion and the abrasion resistance.
FIG. 2 is a cross-sectional view showing the shape of a workpiece employed in the test 1.
Figure 3:
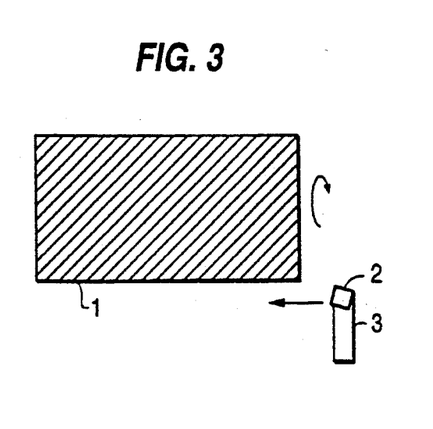
FIG. 3 is a cross-sectional view showing the shape of a workpiece employed in the test 2.
Figure 4:
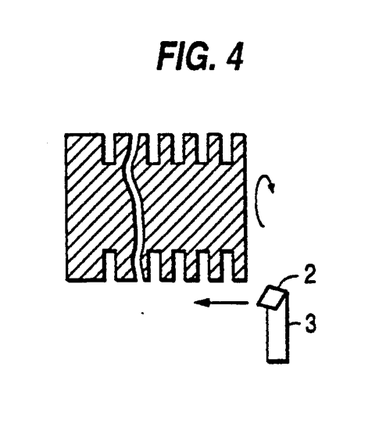
FIG. 4 is a partial cross-sectional view showing the shape of a workpiece employed in the test 3.

|  | Test 1 | Test 2 | Test 3 |
|---|---|---|---|
| workpiece: | Inconel 718 | (FC20) | [FC23] |
| cutting speed (m/minute): | 250 | (600) | [150] |
| depth of cut (mm): | 1 | (0.5) | [2] |
| feed (mm/rev): | 0.25 | (0.2) | [0.6] |
| coolant: | Water-soluble oil | (none) | [none] |
| cutting speed (sec): | until fracture | (330) | [until fracture] |
| judgement of durability: | sec | (mm) | [number of ridges] |
| shape of workpiece (1 in the figure): | | | |
| Test 1: | doughnut shape with an outer diameter of 300 mm and an inner diameter of 200 mm as shown in FIG. 2 | | |
| Test 2: | (rod shape with an outer diameter of 240 mm as shown in FIG. 3) | | |
| Test 3: | [rod shape until annular grooves, with the ridge width of 15 mm and the rod outer diameter of 210 mm as shown in FIG. 4] | | |

The numeral 3 in the figure shows a holder. The durability was judged in the Test 2 by wear on the lateral sides.

Samples Nos. 1–8 of Table 1 relate to the first Aspect, Sample No. 9 to the second Aspect, and Sample Nos. 10–13 to the third Aspect, respectively. The Sample No. 9 was obtained by sintering the Sample No. 3 followed by heat-treatment at 1500° C. for 4 hours for crystallization. The Sample Nos. 11 to 13 were prepared by sintering the Sample No. 10 with variable sintering temperatures, sintering time and sintering atmosphere (sintering position, e.g., place in saggers or furnace).

The compositional ratio for $Si_3N_4$, inclusive of Sialon, is determined as a function of the use or application. It is therefore difficult to compare all the samples under the same conditions. Thus one type of a higher strength, and 2nd type more suited to Ni alloys and 3 rd type more suited to castings, are shown in the Comparative Sample Nos. 1, 2 and 3, respectively. There is practically no meaning in comparing these types to one another, but there is meaning in comparing the properties within each of the types. Thus the Table 1 is so formulated that the properties may be easily compared within the same type having the same or similar composition of the starting materials (starting powdery mass). The results of the comparison are given hereinbelow. The test pieces of the Comparative Samples C1 and C3 were prepared by grinding those of the Sample Nos. 1 and 6 by eliminating the material in a depth of more than 2 mm from the surfaces to completely remove the surface portion until the interior portion is exposed (determined by X-ray analysis). The test piece of the Comparative Sample C2 has the composition, which is the same as the composition of Sample No. 3, and has the as-sintered surface in which the Si content of the surface portion has been scarcely reduced.

Sample Nos. 1 and 2 were not subjected to particular surface crystallization treatment, and the boundary phase of the surface portion was mainly glass phases (except for the third component HfN).

Comparison of the inventive Samples to the Comparative Samples with the reduced $Si_3N_4$ and Sialon grain amounts in the surface portion (Sample No. 1 to Comparative Sample C1, Sample No. 3 to Comparative Sample C2, and Sample Nos. 6–8 to Comparative Sample C3) reveals that the abrasion resistance is unexceptionally improved. Although the strength is lowered slightly in each case, it does not present any practical inconvenience. The relative abrasive resistance in the Sample Nos. 6 to 8 and the Comparative Samples C3 is shown in FIG. 1, from which it is seen that the abrasion resistance becomes the higher, the larger the rate of decrease in the Si amount, or $Si_3N_4$ and Sialon grain content, and that such effect becomes most outstanding with the rate of decrease in the Si content in excess of 20% by weight or, decrease of $Si_3N_4$-Sialon grains of 30 vol % or more.

On the other hand, comparison of the Samples Nos. 2, 4 and 6 having the comparison of the Samples Nos. 1, 3 and 5, respectively, plus the compounds of the transition metals of the IVa and VIa groups (HfN, WC and TiN) with the Samples Nos. 1, 3 and 5 reveals that the abrasion resistance is improved over that of the Sample Nos. 1, 3 and 5. However, with a greater amount of the addition of the compound of the transition metal, it may occur that the strength is decreased considerably, as in Comparative Sample C4.

It may be seen from above that, with the Sample Nos. 1 to 8 in which the rate of decrease in the Si content, or decrease of $Si_3N_4$-Sialon grains of 20% by weight or more, or 30% by volume or more, respectively, the abrasion resistance is improved, while the strength is kept unchanged, so that the properties of the materials of the surface and interior portions may be displayed satisfactorily.

Sample Nos. 9–13 show $Si_3N_4$-$Y_2O_2$ base crystal grains in the surface portion resulted from the surface crystallization treatment. These Samples exhibit significant improvement in Test 1 while showing satisfactory results also in Test 3.

TABLE 1

| Sample No. | Compositional ratio (wt %) | Si-decrease rate (R) | Rate of decrease of $Si_3N_4$—Sialon grains (vol %) | Crystalline boundary phase observed by X-ray | Test 1 (sec) | Test 2 (mm) | Number of ridges |
| --- | --- | --- | --- | --- | --- | --- | --- |
| No. 1 | 86$Si_3N_4$, 7MgO, 7$ZrO_2$ | 57 | 77 | ZrONC trace | 39 | 0.29 | 19 |
| C1 | same as above | 0 | 0 | " | 10 | 0.38 | 20 |
| No. 2 | 76$Si_3N_4$, 7MgO, 7$ZrO_2$, 10HfN | 61 | 80 | " | 43 | 0.25 | 10 |
| No. 3 | 80$Si_3N_4$, 10$Y_2O_3$, 10$Al_2O_3$ | 52 | 62 | none | 65 | 0.25 | 15 |
| C2 | same as above | 0 | 0 | none | 30 | 0.30 | 16 |
| No. 4 | 70$Si_3N_4$, 10$Y_2O_3$, 10$Al_2O_3$, 10WC | 44 | 65 | none | 50 | 0.22 | 13 |
| No. 5 | 84$Si_3N_4$, 8$Y_2O_3$, 3$Al_2O_3$, 5AlN | 57 | 80 | Mellitlite | 34 | 0.20 | 10 |
| No. 6 | 64$Si_3N_4$, 8$Y_2O_3$, 3$Al_2O_3$, 5AlN, 20TiN | 25 | 31 | " | 40 | 0.22 | 6 |
| No. 7 | same as above | 38 | 47 | " | 48 | 0.19 | 6 |
| No. 8 | same as above | 60 | 65 | " | 55 | 0.14 | 6 |
| C3 | same as above | 0 | 0 | " | 20 | 0.33 | 8 |
| **C4 | 44$Si_3N_4$, 8$Y_2O_3$, 3$Al_2O_3$, 5AlN, 40TiN | 55 | 53 | " | 24 | 0.28 | 1 |
| No. 9 | No. 3 | 67 | 74 | H | 79 | 0.23 | 14 |
| No. 10 | 72$Si_3N_4$, 10$Y_2O_3$, 3$Al_2O_3$, 15TiN | 42 | 55 | A | 70 | 0.26 | 10 |
| No. 11 | same as above | 51 | 62 | J + A | 60 | 0.21 | 9 |
| No. 12 | same as above | 45 | 47 | K + J | 78 | 0.23 | 10 |
| No. 13 | same as above | 55 | 60 | H + M | 67 | 0.23 | 7 |

**outside of the inventive scope
C: comparative example
M, H, A, J and K represent Mellilite phase and H-, A-, J- and K-phase, respectively.

EXAMPLE 2

Fourth and Fifth Aspects

The effect of the mellilite phase as the crystalline grain boundary phase was checked. Samples were prepared using the compositions and the sintering conditions favorable for formation of the mellilite phase.

As starting powders, $Si_3N_4$ powders $Al_2O_3$ or MgO powders, AlN powders, $Y_2O_3$ powders, $ZrO_2$ powders and TiN powders, as in Example 1, and further $Yb_2O_3$ powders with a man particle size of 5.1 μm, were mixed together with the compositional ratios shown in Table 2 and the resulting mass was mixed for 48 hours in a wet ball mill for 48 hours, admixed with the molding aid and dried.

Figure 8:
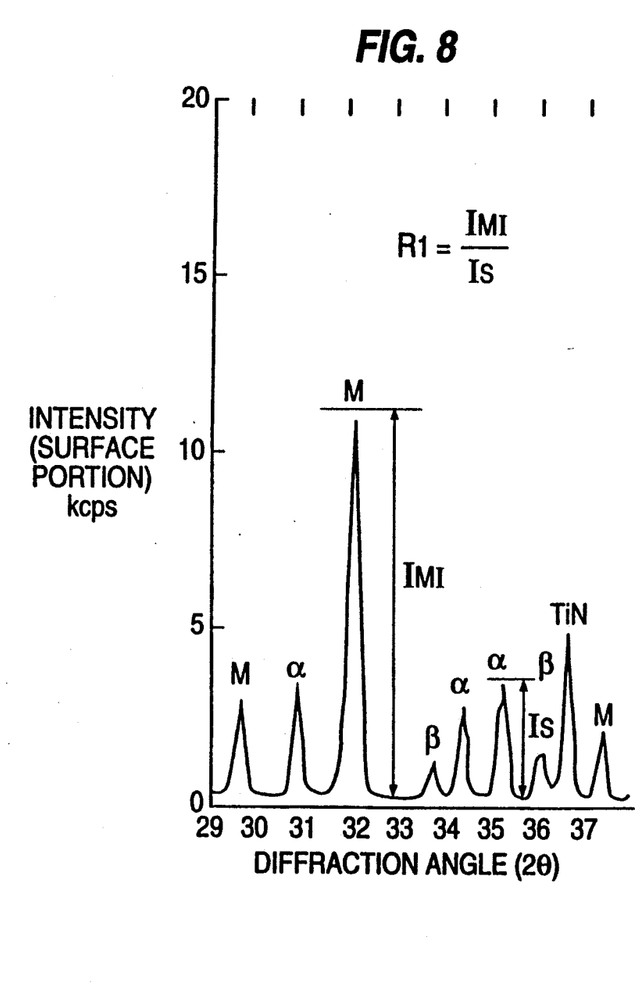
FIG. 8 is a chart showing the results of X-ray diffraction analyses on the surface portion of the sintered body of Sample No. 28.
Figure 9:
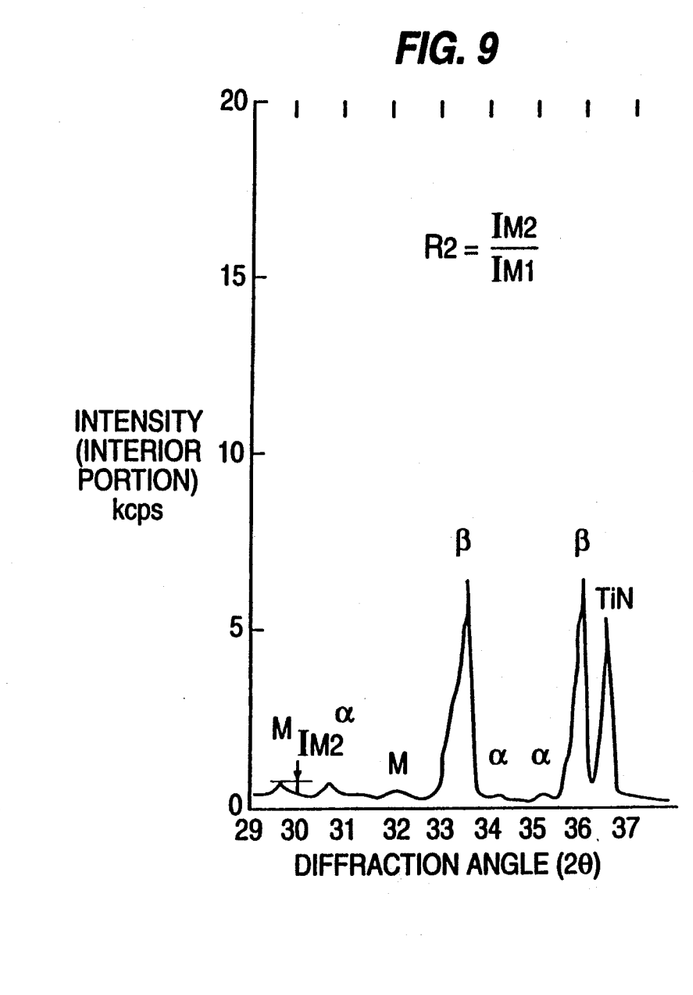
FIG. 9 is a chart showing the results of X-ray diffraction analyses in the inside portion of the sintered body of Sample No. 28.
Figure 10A:
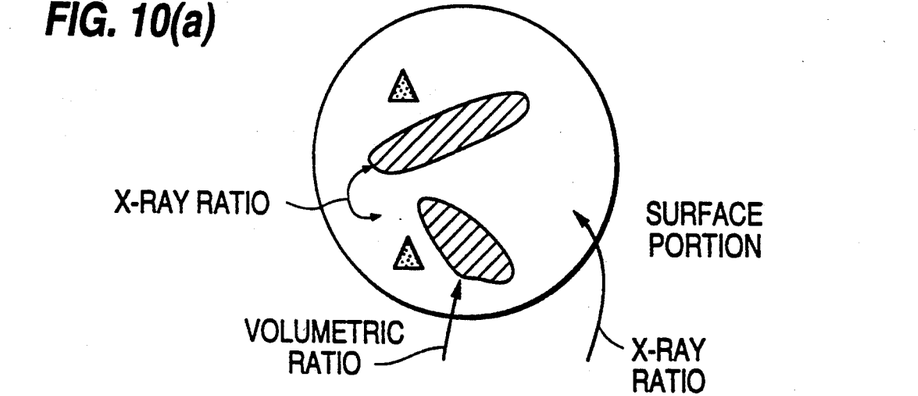
FIG. 10(a) and (b) are diagrammatic views showing the structure of the surface and interior portions, respectively.
Figure 10B:
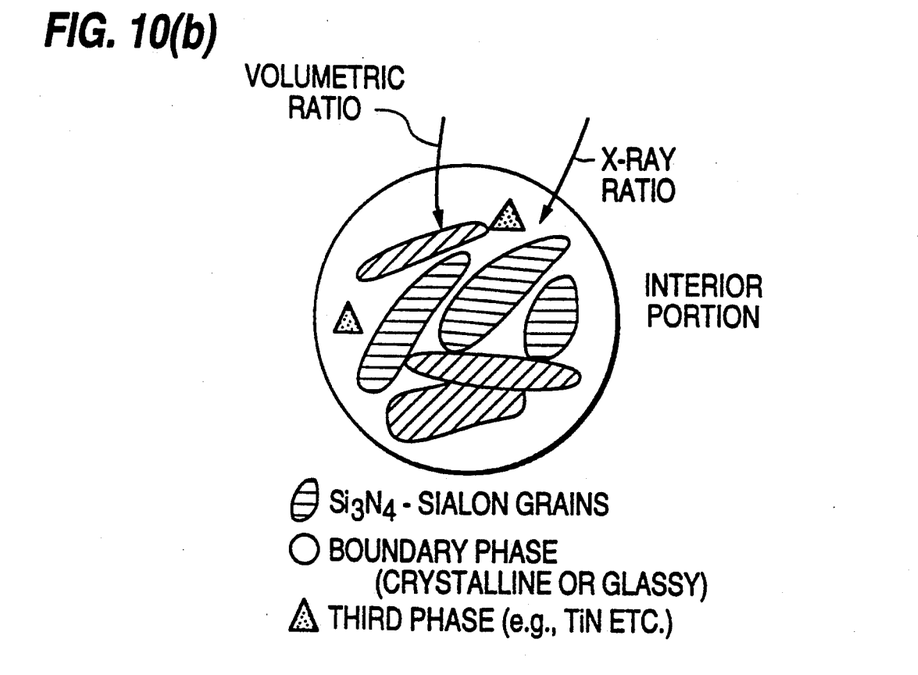

These powders were shaped in a metallic mold to provide compacts which were then sintered under various atmosphere at different temperatures of 1650° to 1750° C. and nitrogen pressures of 0.7 to 10 atmospheres to produce sintered bodies with various mellilite amounts. The results are shown in Table 2. The rate of decrease of $Si_3N_4$ and Sialon grains in the surface portion for Samples Nos. 27–29 is 100 vol %. The thickness of the surface portion of the Sample 27 is about 3 μm, while that of the surface portion of the Sample 28 is about 1.5 μm. The results of X-ray diffraction analyses of the surface and interior portions of the Sample 28 are shown in FIGS. 8 and 9, respectively. The thickness of the surface portion was measured, after surface removal through grinding, by X-ray diffraction of the microregion of the surface portion. The mellilite/silicon nitride content ratio $R_1$ in the surface portion was calculated, as shown in FIG. 8, by the formula $R_1 = I_{M1}/I_S$, whereas the ratio of the mellilite content in the interior portion to that in the surface portion was determined by the ratio of $I_{M2}$ in FIG. 9 to $I_{M1}$ in FIG. 8, that is, by the formula $R_2 = I_{M2}/I_{M1}$.

The sintered bodies were finished to a size of SNMN 432 (JIS B4103). For finishing, the upper and the lower surfaces were ground, while the lateral surfaces were left as as-cast surfaces. These sintered bodies were used as a test piece or tip 2. The size of the test piece 2 was adjusted at the time of press molding. Evaluation was made by the following two tests. The results are shown in Table 2 and FIGS. 5 to 8.

The testing conditions for Tests Nos. 4 and 5 are shown below, while those for test No. 2—2 are shown in brackets. The durability for test No. 4 is shown by the amount of wear ni mm and that for test No. 5 is shown by the number of ridges (projections) cut until fracture.

|  | Test 1 | (Test 5) |
| --- | --- | --- |
| Workpiece; | FC20 | (FC23) |
| cutting speed (m/min); | 600 | (150) |
| depth of cut (mm); | 0.5 | (2) |
| feed (mm/rev); | 0.2 | (0.6) |
| cutting oil; | none | (none) |
| cutting time (sec); | 330 | (until fracture) |
| durability judgment; | mm | (number of ridges) |

The shape of workpiece (1 in the drawing); rod shape with an outer diameter of 240 mm as shown in FIG. 3 (rod shape with a ring-like groove with an outer diameter of 240 mm and a width of ridge of 15 mm as shown in FIG. 4)

The durability for test No. 4 was judged on the basis of the amount of wear caused on the lateral side.

The composition ratios for $Si_3N_4$ and/or Sialon are determined according to the use and applications. Thus it is almost meaningless to compare series of different compositional ratios with one another, but it is meaningful to compare the Samples within the same series with one another. The samples of the Comparative Samples C21 and C24 have been ground in a thickness of more than 0.5 mm from the surface to remove the surface portion completely to expose the interior portion and are marked * in Table 2.

With the inventive Sample Nos. 21 and 22, as compared with Comparative Sample C21 and with Sample Nos. 27 to 30 as compared with Comparative Samples C22 to C24, the amount of wear is reduced, and wear resistance is improved, while the number of ridges until fracture is unchanged the resistance to fracture is maintained. Sample Nos. 23, 24, 25 and 26 are also superior in the wear resistance. The test results on the amount of wear are shown in FIGS. 6 and 7 with respect of Samples Nos. 27–30 and Comparative Samples C22 and C23.

Figure 6:
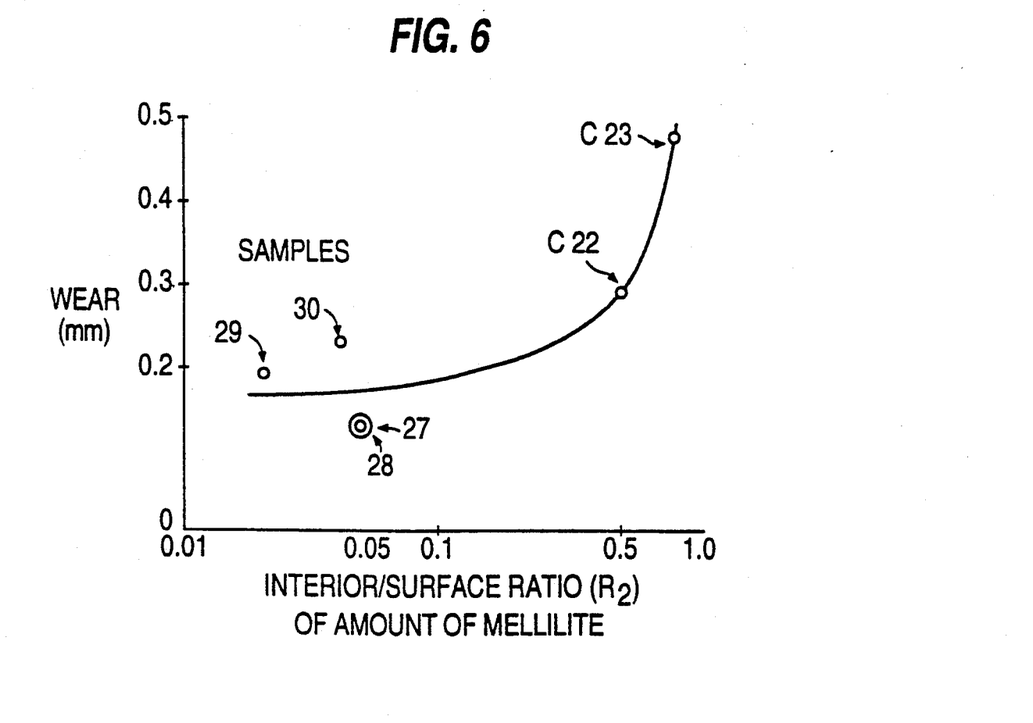
FIG. 6 is a chart showing the relation between the surface portion interior portion ratio $R_2$ of the content of mellilite and the wear resistance.
Figure 7:
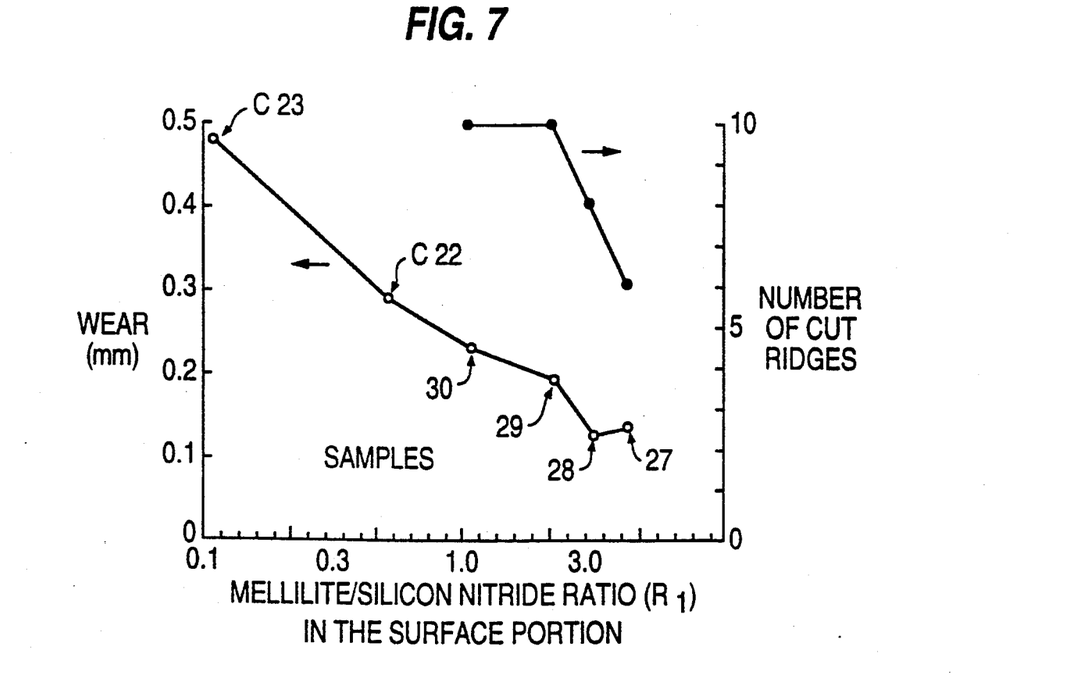
FIG. 7 is a chart showing the relation between mellilite/silicon nitride content ratio $R_1$ in the surface portion and the wear resistance.

As shown in FIG. 6, the amount of wear in the inventive Sample Nos. having the interior/surface ratio of the mellilite content lower than 0.5 is less than that of the Comparative Samples in which this ratio is not less than 0.5. Comparison between Samples No. 21 and No. 22 and Comparative Sample C21, between Samples Nos. 23 and 24 and between Sample Nos. 25 and 26 shows that the amount of wear is less in the firstly recited Samples than in the secondly recited Samples. It may thus be seen that the better wear resistance results when the ratio is smaller, that is when the mellilite content is higher in the surface portion than in the interior portion.

FIG. 6 also shows that the greater than amount of the mellilite in the surface portion of a Sample, the higher the wear resistance of the Sample. This may be demonstrated by the fact that, on comparison between Sample Nos. 21 and 22 and Comparative Sample C21, between Sample Nos. 23 and 24 and between Sample Nos. 25 and 26, the amount of wear is less in the firstly recited Samples with the higher value of the above ratio than in the secondly recited Samples with the lower value of the above ratio. As shown in FIG. 7, when the product of the two ratios $R_1$ and $R_2$ becomes larger and the mellilite content in the grain boundary phase in the interior portion is increased, as in Sample Nos. 27 and 28, the number of the ridges cut is reduced and the resistance to fracture is lowered.

The commercial Sialon cutting tool of Comparative Sample C25 is particularly susceptible to wear, while the commercial coated silicon nitride cutting tool of Comparative Sample C26 is extremely susceptible to fracture.

It is seen from above that, with Sample Nos. 21 to 30, the mellilite/silicon nitride content ratio in the surface portion is in the range of 0.37 to 4.5, and the interior portion/surface portion content ratio of mellilite is 0.02 to 0.31, the abrasion resistance is improved with the resistance to fracture not being lowered, such that the properties of the materials constituting the surface and interior portions may be exhibited most satisfactorily. The rate of decrease of $Si_3N_4$-Sialon grains shows (i) that the grain boundary phase is more abundant in the surface portion than in the inside portion. However, it cannot be said that the rate of decrease of the $Si_3N_4$-Sialon grains is not necessarily correlated with the content ratio $R_2$. It is seen that (ii) crystallization is more ready to occur in the surface portion than in the interior portion. Thus the ratio $R_2$ is thought to be determined by the synergistic effects of (i) and (ii).

With the silicon nitride base sintered body according to the fourth and fifth Aspects, the intrinsic properties of higher wear resistance in the surface portion and high toughness in the interior portion may be displayed fully, respectively, because of the higher mellilite content in the surface portion than in the interior portion. Thus, with the present sintered body, intermediate properties which are a compromise between two properties, as exhibited with the conventional sintered body, are not exhibited. Thus it is possible with the present sintered body to improve the wear resistance by surface modification without lowering the intrinsic properties of the inner portion. The surface and interior portions are integral with each other with a high bonding strength so that they do not peel one from the other.

With the silicon nitride base sintered body of the fifth aspect, the mellilite content in the surface portion is higher than the silicon nitride content to guarantee wear resistance reliably.

As evident in the preceding embodiments the improvement is significant. However, additional coating layer or layers may be applied onto the inventive sintered body, the coating layer being formed of $Al_2O_3$, TiC, TiN, AlON or the like in a thickness of 0.5–10 μm.

It should be noted that modification in the art may be done without departing from the gist and concept of the present invention as disclosed herein and within the scope of claims hereinbelow annexed.

formed of silicon nitride and Sialon with boundary phases.

6. The sintered as defined in claim 5, in which the sintered body further comprises third components in an amount of 30% by weight or less of the entire sintered body, the third components being at least one selected from the group consisting of compounds of subgroups IVa, Va and VIa of the International Periodic Table.

7. The sintered body as defined in claim 6, in which said compounds are selected from the group consisting of oxides, carbides and nitrides and solid solutions thereof.

8. The sintered body as defined in claim 7, in which said compounds are selected from the group consisting of $ZrO_2$, WC and TiN.

9. The sintered body as defined in claim 5, in which the boundary phases are formed of a sintering aid.

10. The sintered body as defined in claim 9, in which

TABLE 2

| No. | Compositional ratio (wt %) | Rate of decrease of $Si_3N_4$—Sialon grains (vol %) | Mellilite/ Silicon nitride ratio $R_1$ | interior/surface ratio $R_2$ | Test 4 (mm) | Test 5 Number of ridge |
|---|---|---|---|---|---|---|
| No. 21 | $88Si_2N_4$, $3Y_2O_3$, $3Al_2O_3$, $6ZrO_3$ | 76 | 1.22 | 0.15 | 0.29 | 12 |
| No. 22 | same as above | 43 | 0.51 | 0.10 | 0.33 | 14 |
| C21 | same as above | — | 0 | * | 0.69 | 15 |
| No. 23 | $75Si_3N_4$, $10Y_2O_3$, $10Al_2O_3$, 5MgO | 45 | 0.66 | 0.14 | 0.25 | 8 |
| No. 24 | same as above | 38 | 0.37 | 0.31 | 0.29 | 8 |
| No. 25 | $71Si_3N_4$, $4Y_2O_3$, $4Al_2O_3$, 7AlN, $12Yb_2O_3$ | 86 | 2.5 | 0.07 | 0.22 | 6 |
| No. 26 | same as above | 59 | 0.92 | 0.08 | 0.30 | 9 |
| No. 27 | $70Si_3N_4$, $8Y_2O_3$, $3Al_2O_3$, 4AlN, 15TiN | 100** *** | 4.5 | 0.05 | 0.12 | 6 |
| No. 28 | same as above | 100*** | 3.3 | 0.05 | 0.12 | 8 |
| No. 29 | same as above | 100 | 2.3 | 0.02 | 0.19 | 10 |
| No. 30 | same as above | 95 | 1.1 | 0.04 | 0.23 | 10 |
| C22 | same as above | 28 | 0.52 | 0.52 | 0.29 | 4 |
| C23 | same as above | 20 | 0.11 | 0.85 | 0.48 | 8 |
| C24 | same as above | — | 0.52 | * | 0.46 | 4 |
| C25 | marketed as Sialon tool | — | — | — | 0.53 | 11 |
| C26 | marketed coated silicon nitride tool | — | — | — | 0.24 | 1 |

*Surface portion removed.
**100% means there are no $Si_3N_4$—Sialon grains observed.
***Sample No. 27 and No. 28 have a surface portion in a layer of 3 μm and 1.5 μm thick, respectively, the layer is formed of TiN (third component) and boundary phases.

What is claimed is:

1. A sintered body of silicon nitride base having a surface portion formed integrally with an interior portion of the body, wherein the rate of decrease of the Si content in the surface portion, with respect to the Si content in the interior portion, as calculated by the formula Rate of Decrease of Si = [{Si content in the Interior Portion − Si content in the Surface Portion}/ Si content in the Interior Portion] × 100 is not less than 20% by weight;

and wherein the amount of crystal grains of silicon nitride and SiAlON in the surface portion is smaller than the amount of crystal grains of silicon nitride and SiAlON in the interior portion by 30 vol % or more.

2. The sintered body as defined in claim 1, in which the surface portion with the decreased Si content has been produced through sintering.

3. The sintered body as defined in claim 1, in which the rate of decrease of Si is 25–61% by weight.

4. The sintered body as defined in claim 3, in which the rate of decrease of Si is 50–60% by weight.

5. The sintered body as defined in claim 1, in which the interior portion of the sintered body is mainly the sintering aid is at least one selected from the group consisting of $Al_2O_3$, YN, AlN, MgO, CaO, $Y_2O_3$ and rare earth oxides.

11. The sintered body as defined in claim 1, in which the surface portion is at least about 1.5 micrometers thick.

12. The sintered body as defined in claim 11, in which the surface portion is not more than 0.1 mm thick.

13. The sintered body as defined in claim 1, which has been produced by sintering a mass of α-silicon nitride base composition at a temperature of 1550°–1800° C. under a condition which allows vaporization of any silicon nitride present in the surface portion of the mass.

14. The sintered body as defined in claim 13, in which the sintering has been performed in an atmosphere of a reduced partial pressure of nitrogen and/or silicon, or in a reducing atmosphere.

15. The sintered body as defined in claim 11, in which the surface portion is not more than 1 mm thick.

16. A silicon nitride base sintered body formed of an interior portion and a surface portion which is formed integrally with the interior portion, wherein crystal grains of silicon nitride and Sialon in the surface portion are present in an amount less by 30 vol % or more than that in the interior portion.

17. The silicon nitride base sintered body as defined in claim 16 wherein part or entire of a grain boundary phase in the surface portion is crystallized.

18. The silicon nitride base sintered body as defined in claim 17 wherein the ratio of the content of crystalline compound(s) constituting part or entire of the grain boundary phase in the surface portion to that in the interior portion is 0.5 or more as measured by the X-ray peak intensity ratio method.

19. The silicon nitride base sintered body as defined in claim 17 wherein the ratio of the amount of crystalline compound(s) constituting part or entire of the grain boundary phase to the amount of the silicon nitride and Sialon grains in the surface portion is not less than 0.3 as measured by the maximum X-ray intensity ratio method.

20. The silicon nitride base sintered body as defined in claim 17, 18 or 19 wherein the crystallized grain boundary phase in the surface portion comprises at least one $Si_3N_4-Y_2O_3$ base compound expressed by $Si_2N_4-nY_2O_2-mX$ where n=1-5, X=$SiO_2$ or $Al_2O_3$ and m=0-4.

21. The silicon nitride base sintered body as defined in claim 20 wherein said $Si_3N_4-Y_2O_3$ base compound is a mellilite-, J-, K-, H- or A-phase or a mixtures of these phases.

22. A silicon nitride base sintered body as defined in claim 17 wherein the ratio of mellilite content in the interior portion to mellilite content in the surface portion is less than 0.5 as measured by the X-ray peak intensity ratio method.

23. The silicon nitride base sintered body as defined in claim 22 wherein the ratio of the mellilite content to the content of silicon nitride and Sialon in the surface portion as measured by the maximum X-ray intensity ratio method is not less than 0.3.

24. A silicon nitride base sintered body formed of an interior portion and a surface portion formed integrally with the interior portion wherein ratio of the mellilite content in the interior portion to that in the surface portion is lower than 0.5 as measured by the X-ray peak intensity ratio method.

25. The silicon nitride base sintered body as defined in claim 24 wherein the ratio of the mellilite content is silicon nitride and Sialon content in the surface portion is not less than 0.3 as measured by the maximum X-ray intensity ratio method.

26. The silicon nitride base sintered body as defined in claim 18 wherein the crystalline grain boundary phase in the surface portion consists essentially of mellilite.

27. The silicon nitride base sintered body as defined in claim 26 wherein the ratio of the mellilite content to the content of silicon nitride and Sialon in the surface portion is not less than 0.3 as measured by the maximum X-ray intensity ratio method.

28. The silicon nitride base sintered body as defined in claim 16, wherein the amount of silicon nitride and Sialon grains in the surface portion is less by 50 vol % or more than that in the interior portion.

29. The sintered body as defined in claim 16, 17, 18, 19 or 24, in which the sintered body further comprises third components in an amount of 30% by weight or less of the entire sintered body, the third components being at least one selected from the group consisting of compounds of subgroups IVa, Va and Via of the International Periodic Table.

30. The sintered body as defined in claim 29, in which said compounds are selected from the group consisting of oxides, carbides and nitrides and solid solutions thereof.

31. The sintered body as defined in claim 30, in which said compounds are selected from the group consisting of $ZrO_2$, WC and TiN.

32. The sintered body as defined in claim 17, in which the boundary phases are formed of a sintering aid.

33. The sintered body as defined in claim 32, in which the sintering aid is at least one selected from the group consisting of $Al_2O_3$, YN, AlN, MgO, CaO, $Y_2O_3$ and rare earth oxides.

34. The sintered body as defined in claim 33, in which the surface portion is at least about 1.5 micrometers thick.

35. The sintered body as defined in claim 34, in which the surface portion is not more than 0.1 mm thick.

36. The sintered body as defined in claim 34, in which the surface portion is not more than 1 mm thick.

37. The sintered body as defined in claim 21, in which the crystallized grain boundary phase in the surface portion comprises A-phase.

38. The sintered body as defined in claim 21, in which the crystallized grain boundary phase in the surface portion comprises J-phase and A-phase.

39. The sintered body as defined in claim 21, in which the crystallized grain boundary phase in the surface portion comprises K-phase and J-phase.

40. The sintered body as defined in claim 21, in which the crystallized grain boundary phase in the surface portion comprises H-phase and M-phase.

41. The silicon nitride base sintered body as defined in claim 17, wherein the grain boundary phase in the surface portion has been crystallized at a temperature range of 1400° to 1700° C.

42. The silicon nitride base sintered body as defined in claim 17, wherein the grain boundary phase in the surface portion has been crystallized at a temperature range of 1500° to 1650° C.

* * * * *